United States Patent Office 3,326,329
Patented June 20, 1967

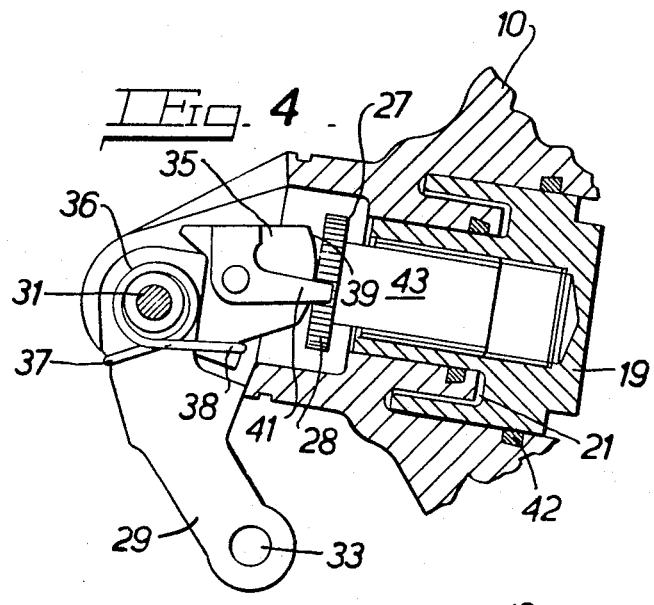
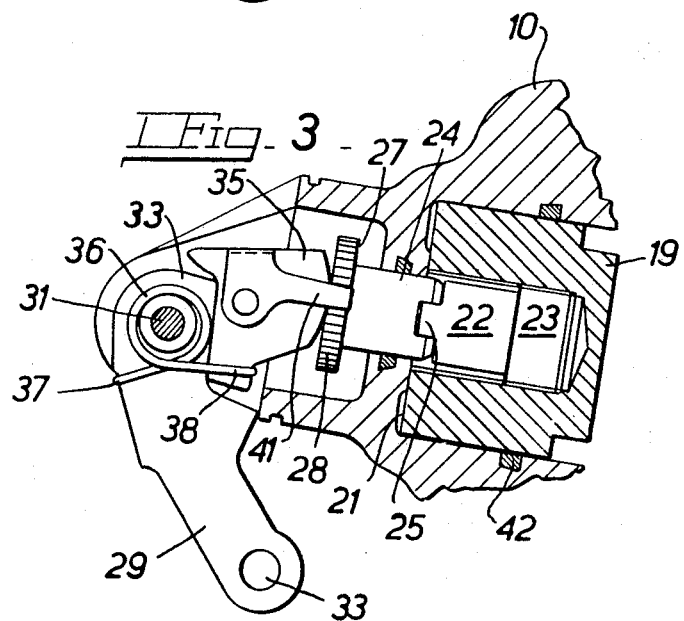

3,326,329
ACTUATING AND SELF-ADJUSTING MECHANISM
FOR DISC BRAKES
Anthony W. Harrison, Birmingham, England, assignor to
Girling Limited, Tyseley, Birmingham, England, a British company
Filed Aug. 27, 1965, Ser. No. 483,052
Claims priority, application Great Britain, Aug. 29, 1964,
35,469/64
10 Claims. (Cl. 188—73)

This invention relates to improvements in actuating mechanism for disc brakes of the kind in which a friction pad is applied to a rotatable disc by hydraulic means for service braking and is applied mechanically for parking or emergency braking.

According to our invention, in a brake of that kind a friction pad is applied to a rotatable disc by a piston working in an hydraulic cylinder in one limb of a caliper straddling a portion of a periphery of the disc and is also applied by a lever or cam pivoted on the caliper and acting through an intermediate member in sliding and rocking engagement with the outer end of a tappet or thrust member which is in screw-threaded engagement with the piston, excessive movement of the intermediate member relative to the tappet in the application of the brake by the lever due to wear of the friction surfaces being arranged to rotate the tappet or thrust member through ratchet and pawl or equivalent mechanism to increase the effective length of the piston and tappet assembly.

One form of disc brake incorporating an adjuster in accordance with our invention and two modifications are illustrated by way of example in the accompanying drawings in which:

FIGURE 3 is a section of the hydraulic cylinder and piston, mechanical actuator and adjuster showing a modified arrangement of the intermediate member; and FIGURE 4 is a section similar to FIGURE 1 but showing a modification of the tappet or thrust member.

Figure 1:
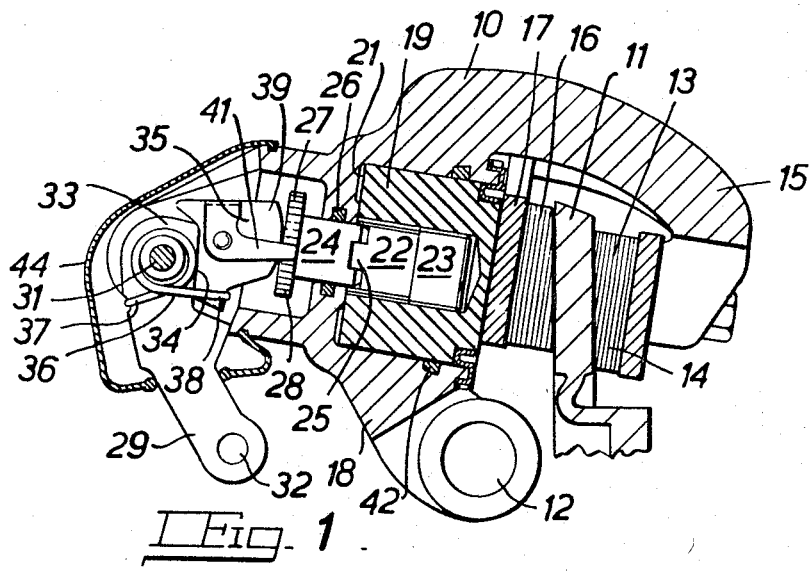
FIGURE 1 is a section of the brake in a radial plane.

The brake illustrated is of the kind in which a caliper 10 which straddles a portion of the periphery of a rotatable disc 11 is mounted to swing on a stationary part about an axis 12 substantially at right angles to the axis of the disc. A friction pad 13 for engagement with one face of the disc is bonded or otherwise secured to a rigid backing plate 14 mounted on or backed by one limb 15 of the caliper. A friction pad 16 for engagement with the other face of the disc is carried by a backing plate 17 slidably guided in the limb 18 of the caliper for movement towards and away from the disc. The friction pads are of wedge shape and the pad 13 is offset radially inwards with respect to the pad 16 as described in the specification of our U.S. Patent No. 3,273,675. The pad 17 is applied to the disc by a piston 19 working in an hydraulic cylinder 21 in the limb 18 of the caliper and the pad 13 is applied to the opposite face of the disc by the reaction on the caliper which swings about the axis 12.

The pad 17 is also adapted to be applied mechanically by a tappet acting on the piston 19. The tappet comprises an inner part 22 which is in screw-threaded engagement with an axial recess 23 in the outer end of the piston and an aligned outer part 24 coupled to the inner part by an axially slidable tongue and groove coupling 25. The outer part 24 extends through a seal 26 around an axial opening in the outer end of the cylinder and terminates in a head or radially projecting flange 27 having a series of peripheral ratchet teeth 28.

For mechanical actuation of the brake a lever 29 is pivoted on a pin 31 between projecting lugs on the limb 18 of the caliper and the free end of the lever is formed with a hole 32 for the connection of a rod or cable leading to a hand lever or the like. The lever has a tapered nose 33 of which the side faces are substantially at right angles to each other, and in the off position of the parts one face of the nose is held by a spring in engagement with a complementary flat surface 34 on an intermediate member 35 as shown in FIGURE 1. The spring 36 is a wire spring which is coiled round the pin 31 and has hooked ends 37 and 38 respectively engaging the lever and the intermediate member and urging the intermediate member against the lever.

On the inner side of the intermediate member there is an arcuate face 39 in rocking and sliding engagement with the outer end of the tappet which is flat, and the intermediate member, carries a resilient pawl 41 which co-operates with the ratchet teeth 28 on the tappet.

The brake is applied mechanically by angular movement of the lever 29 in a clockwise direction about its pivot 31. The strength and disposition of the spring 36 holding the intermediate member 35 in engagement with the lever are such that in the initial part of the movement of the lever while clearances are being taken up and resistance to axial movement of the piston and tappet is relatively small the intermediate member moves as one with the lever and the arcuate face 39 on the inner side of the intermediate member slides on the flat outer end of the tappet. If the relative sliding movement exceeds a predetermined value the pawl 41 rides over one or more of the ratchet teeth on the tappet.

Figure 2:
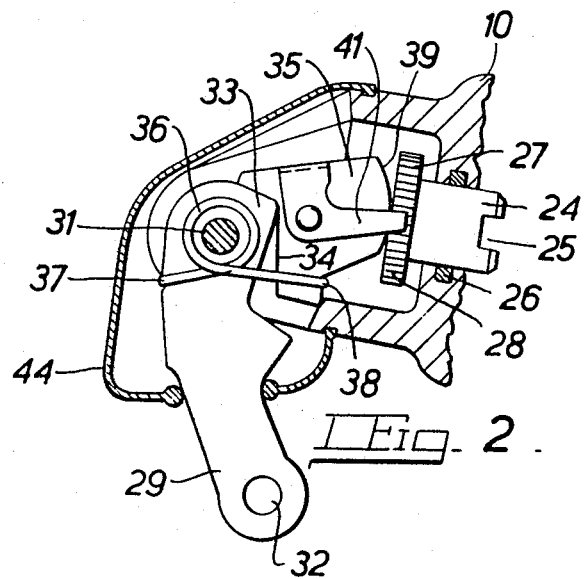
FIGURE 2 is a section of the mechanical actuator and adjuster showing the position of the parts under load.

When the friction surfaces are in full engagement and resistance to movement of the piston and tappet increases the nose 33 on the lever continues the inward movement of the intermediate member but the arcuate inner end of the intermediate member now rolls on the outer end of the tappet and the intermediate member moves angularly relative to the lever against the resistance of the spring 36 as indicated in FIGURE 2.

On the return movement of the intermediate member on release of the brake the tappet will be rotated through an angle equal to the spacing of one or more ratchet teeth if the movement of the pawl with the member has been sufficient to cause the pawl to ride over one or more teeth in the application of the brake, so that the effective length of the assembly formed by the piston and tappet is increased and the off position of the piston is moved nearer to the disc.

The pawl and ratchet teeth are in the same plane as the contact between the intermediate member and the outer end of the tappet so that there is only relative rolling movement between them when the intermediate member is rolling on the tappet under load and the adjustment is not affected by structure deflection.

In a modification shown in FIGURE 3 the direction of the ratchet teeth is reversed and the pawl is correspondingly modified so that the pawl rides over the teeth on the return movement of the intermediate member, and the angular movement of the tappet for adjustment is effected during the next application of the brake while there is sliding movement between the intermediate member and the tappet.

The formation of the tappet in two parts slidably coupled together has the advantage that when the brake is applied hydraulically only the inner part moves with the piston which is held against rotation by the frictional resistance of its seal 42 or by any other convenient means.

The tappet may however be formed as a single member 43 in screw-threaded engagement with the recess in the piston as shown in FIGURE 4.

The mechanism for applying the brake from a hand lever or the like is preferably enclosed by a flexible rubber or other boot 44 attached to the caliper and having an opening through which the outer end of the lever extends as shown in FIGURES 1 and 2.

In a modification the lever 29 may be replaced by a cam of suitable outline.

I claim:

1. In a vehicle brake including a rotatable member and at least one friction element having a rear side and a front side adapted to be urged into braking engagement with said rotatable member, the invention comprising means for applying the friction element to the rotatable member comprising a lever, a fixed pivot about which said lever is angularly movable, a thrust member acting on said friction element, said thrust member having an inner end and an outer end, means guiding said thrust member for sliding movement in a direction substantially normal to the rear side of said friction element, an intermediate member interposed between said lever and the outer end of said thrust member, said intermediate member having a first end engaging directly with said lever and a second end engaging directly with the outer end of said thrust member, co-operating means between the first end of said intermediate member and said lever for rockingly supporting the first end of said intermediate member for angular movement relative to said lever, resilient means of a predetermined strength at all times opposing rocking movement of said intermediate member relative to said lever and co-operating with said intermediate member to restrain it in substantially the same angular position with respect to the lever during an initial movement of said friction element into engagement with said rotatable braking member, whereby the second end of said intermediate member has a sliding engagement with the outer end of said thrust member, said resilient means thereafter yielding when said lever applies a predetermined braking load to said intermediate member and thereby exerts a force thereon in excess of the strength of said resilient means whereby said intermediate member is rocked by said lever transversely to the line of action of said lever and there is a rolling engagement between the second end of the intermediate member and the outer end of said thrust member.

2. The vehicle brake as claimed in claim 1, wherein said thrust member includes first and second parts movable relative to each other to adjust the length of the thrust member, and means co-operating with said intermediate member and one of said parts to move it relative to the other to increase the length of the thrust member when the relative sliding movement between said intermediate member and said thrust member exceeds a predetermined value as the friction element wears.

3. The vehicle brake as claimed in claim 2, wherein said first and second parts are in screw-threaded engagement with each other, a ring of ratchet teeth on one of said parts, and a pawl movable with said intermediate member upon angular movement of said lever in the application of the brake, said pawl being constructed and arranged to engage successive teeth upon relative sliding movement between said intermediate member and said thrust member exceeding said predetermined value.

4. In a vehicle disc brake including a rotatable disc, a caliper straddling a portion of the periphery of the disc, friction elements located in the caliper for engagement with opposite faces of the disc, each friction element having a rear side and a front side adapted to be urged into braking engagement with said disc, an hydraulic cylinder in one limb of the caliper, and a piston working in the cylinder for applying the adjacent friction element directly to the disc and acting on the rear side of said directly actuated friction element, the invention comprising means for applying the directly actuated friction element to the disc mechanically comprising a lever, a fixed pivot in the caliper about which said lever is angularly movable, a thrust member acting on said piston, means guiding said thrust member for movement with said piston in a direction substantially normal to the rear side of said directly actuated friction element, an intermediate member interposed between said lever and the outer end of said thrust member, said intermediate member having a first end engaging directly with said lever and a second end engaging directly with the outer end of said thrust member, co-operating means between the first end of said intermediate member and said lever for rockingly supporting the first end of said intermediate member for angular movement relative to said lever, resilient means of a predetermined strength at all times opposing rocking movement of said intermediate member relative to said lever and co-operating with said intermediate member to restrain it in substantially the same angular position with respect to the lever during an initial movement of said directly actuated friction element into engagement with said disc, whereby the second end of said intermediate member has a sliding engagement with the outer end of said thrust member, said resilient means thereafter yielding when said lever applies a predetermined braking load to said intermediate member and thereby exerts a force thereon in excess of the strength of said resilient means whereby said intermediate member is rocked by said lever transversely to the line of action of said lever and there is a rolling engagement between the second end of the intermediate member and the outer end of said thrust member.

5. The vehicle brake as claimed in claim 4, and further including means for preventing rotation of said piston relative to said cylinder, wherein said piston has an axial recess in which said thrust member is in screw-threaded engagement, and means co-operating with said intermediate member and said thrust member to rotate the latter relative to said piston to increase the length of an assembly formed by the thrust member and the piston when the relative sliding movement between said intermediate member and said thrust member exceeds a predetermined value.

6. The vehicle brake as claimed in claim 5, wherein said thrust member comprises inner and outer aligned parts, said inner part only being in screw-threaded engagement in said recess in said piston, and means slidably coupling said inner and outer parts for freely separable engagement whereby when the brake is applied hydraulically only said inner part moves with said piston.

7. The vehicle brake as claimed in claim 5, and further including a ring of ratchet teeth on said thrust member, and a pawl movable with said intermediate member upon angular movement of said lever in the application of the brake, said pawl being constructed and arranged to engage successive teeth upon relative sliding movement between said intermediate member and said thrust member exceeding said predetermined value.

8. In a vehicle brake including a rotatable braking member and at least one friction element having a rear side and a front side adapted to be urged into braking engagement with said rotatable member, the invention comprising means for applying the friction element to the rotatable member comprising a lever, a fixed pivot about which said lever is angularly movable, a non-rotatable applying member acting on said friction element, means guiding said applying member for sliding movement in a direction substantially normal to the rear side of said friction element, a rotatable strut having an inner end and an outer end, a screw-threaded engagement between the inner end of said strut and said applying member, an intermediate member interposed between said lever and the outer end of said strut, said intermediate member having a first end engaging directly with said lever and a second end engaging directly with the outer end of said strut, co-operating means between the first end of said intermediate member and said lever for rockingly supporting the first end of said intermediate member for angular movement relative to said lever, resilient means of a predetermined strength at all times opposing rocking movement of said intermediate member relative to said lever and co-operating with said intermediate member to restrain it in substantially the same angular position with respect to the lever during an initial movement of said friction element into engagement with said rotatable braking member whereby the second end of said intermediate member has a sliding engagement with the outer end of said strut, said resilient means thereafter yielding when said lever applies a predetermined braking load to said intermediate member and thereby exerts a force thereon in excess of the strength of said resilient means whereby said intermediate member is rocked by said lever transversely to the line of action of said lever and there is a rolling engagement between the second end of the intermediate member and the outer end of said strut, a ring of ratchet teeth on said strut, and a pawl movable by said intermediate member and arranged to engage with successive ratchet teeth to rotate the strut and increase the effective length of an assembly formed by the strut and the applying member during said initial movement of said friction element into engagement with said rotatable braking member in which said second end of said intermediate member has a sliding engagement with the outer end of said strut.

9. The vehicle brake as claimed in claim 8, wherein said strut comprises inner and outer aligned parts, said inner part only being in screw-threaded engagement with said applying member, and said ratchet teeth being formed on said outer part, and means slidably coupling said inner and outer parts for freely separable engagement.

10. The vehicle brake as claimed in claim 8, wherein said pawl is carried by said intermediate member and is adapted to ride over said ratchet teeth on said strut when sliding movement of the intermediate member on the strut exceeds a predetermined value in the application or release of the brake by means of the lever.

References Cited
UNITED STATES PATENTS 3,236,336    2/1966    Harrison _____ 188—73
3,269,490    8/1966    Swift _____ 188—72 X MILTON BUCHLER, *Primary Examiner.*

G. E. HALVOSA, *Assistant Examiner.*